US 8,893,166 B2

(12) United States Patent
Park (10) Patent No.: US 8,893,166 B2
(45) Date of Patent: Nov. 18, 2014

(54) METHOD OF SURVEYING WATCHING OF IMAGE CONTENT, AND BROADCAST RECEIVING APPARATUS AND SERVER EMPLOYING THE SAME

(75) Inventor: Tae-suh Park, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 13/427,545

(22) Filed: Mar. 22, 2012

(65) Prior Publication Data

US 2012/0284740 A1    Nov. 8, 2012

(30) Foreign Application Priority Data

May 2, 2011    (KR) .................. 10-2011-0041700

(51) Int. Cl.
  H04N 7/16       (2011.01)
  H04N 21/44      (2011.01)
  H04N 21/24      (2011.01)
  H04N 21/442     (2011.01)
  H04N 21/234     (2011.01)
  H04N 21/258     (2011.01)

(52) U.S. Cl.
  CPC ... *H04N 21/23418* (2013.01); *H04N 21/44008* (2013.01); *H04N 21/2408* (2013.01); *H04N 21/44204* (2013.01); *H04N 21/25866* (2013.01)
  USPC .............................................. 725/19; 725/9

(58) Field of Classification Search
  USPC ......... 725/9, 19; 348/143, 152, 153, 159, 161
  See application file for complete search history.

(56) References Cited

U.S. PATENT DOCUMENTS

| 5,481,294 | A  | * | 1/1996  | Thomas et al. ............... 725/20 |
| 5,666,157 | A  | * | 9/1997  | Aviv ............................ 348/152 |
| 5,917,958 | A  | * | 6/1999  | Nunally et al. ............... 382/276 |
| 5,969,755 | A  | * | 10/1999 | Courtney ...................... 348/143 |
| 6,424,370 | B1 | * | 7/2002  | Courtney ...................... 348/143 |
| 7,616,840 | B2 | * | 11/2009 | Erol et al. .................... 382/305 |
| 2002/0141617 | A1 | * | 10/2002 | Yamashiro et al. ............ 382/103 |
| 2005/0086682 | A1 | * | 4/2005  | Burges et al. .................. 725/19 |
| 2005/0172312 | A1 | * | 8/2005  | Lienhart et al. ................ 725/19 |
| 2006/0184961 | A1 | * | 8/2006  | Lee et al. ...................... 725/32 |
| 2006/0195861 | A1 | * | 8/2006  | Lee ............................... 725/19 |
| 2007/0016918 | A1 | * | 1/2007  | Alcorn et al. .................. 725/22 |
| 2007/0052802 | A1 | * | 3/2007  | Kasutani et al. .............. 348/143 |

(Continued)

FOREIGN PATENT DOCUMENTS

WO    2006026736 A2    3/2006
WO    2011010230 A1    1/2011

OTHER PUBLICATIONS

Communication dated Jun. 23, 2014 issued by European Patent Office in counterpart European Application No. 12161682.5.

*Primary Examiner* — Pankaj Kumar
*Assistant Examiner* — Timothy Newlin
(74) *Attorney, Agent, or Firm* — Sughrue Mion, PLLC (57) ABSTRACT

A method of surveying watching image content, and a broadcast receiving apparatus and server employing the same are provided. The method includes displaying image contents on a screen; capturing and storing signature images of the image contents; and in response to receipt of a query, comprising a target image of image contents to be surveyed, from an external server, determining whether one of the stored signature images is identical to the target image, and transmitting a result of the determining to the external server.

31 Claims, 3 Drawing Sheets

(56) References Cited

U.S. PATENT DOCUMENTS

| | | | |
|---|---|---|---|
| 2007/0124756 A1* | 5/2007 | Covell et al. | 725/18 |
| 2009/0049465 A1* | 2/2009 | Deng | 725/9 |
| 2010/0115543 A1* | 5/2010 | Falcon | 725/19 |
| 2010/0257548 A1* | 10/2010 | Lee et al. | 725/9 |
| 2013/0014137 A1* | 1/2013 | Bhatia et al. | 725/9 |
| 2013/0014194 A1* | 1/2013 | Fukui | 725/114 |

\* cited by examiner

METHOD OF SURVEYING WATCHING OF IMAGE CONTENT, AND BROADCAST RECEIVING APPARATUS AND SERVER EMPLOYING THE SAME

CROSS-REFERENCE TO RELATED PATENT APPLICATION

This application claims priority from Korean Patent Application No. 10-2011-0041700, filed on May 2, 2011 in the Korean Intellectual Property Office, the disclosure of which is incorporated herein in its entirety, by reference.

BACKGROUND

1. Field

Methods and apparatuses consistent with exemplary embodiments relate to surveying the watching of image content, and more particularly, to method of surveying the watching of image content, based on a technology for recognizing a motion picture or video (also referred to as moving pictures) by extracting a signature image of output image contents, and a broadcast receiving apparatus and server employing the same.

2. Description of the Related Art

In the past, the major broadcasters were the only source for moving pictures (i.e., motion pictures and/or video). This is no longer the case. Today, moving pictures are available from other sources, including cable, Internet protocol television (IPTV), video-on-demand (VOD), and the like. This diversification of sources for moving pictures has made a very important to develop technologies for recognizing the programs that users watch. Such technologies may serve as the primary basis for a customized advertising campaign, or for program recommendation services.

A basic method of surveying whether a user watches image contents is a method of searching a database for metadata that is manually generated based on image contents information (e.g., electronic program guide (EPG) information). However, the approach of using such metadata information is problematic in that there is frequently no access to such metadata information, and in that there may be a substantial dearth of the metadata itself, a situation which may arise due to various local policies of copyright holders or broadcasters.

The use of video fingerprints is one alternative to the just-described metadata approach. That is to say, a database is created containing target images of items for which a survey is desired. A signature image of is extracted from a predetermined image source, and the signature image as a query is transmitted to the database. When the database receives the query, whether the signature image is contained in the database is determined, and an identification (ID) of a corresponding image may be obtained. Such technology of moving picture recognition may be referred to as video fingerprint.

In the related art, a target image of image contents to be surveyed must be previously extracted so as to build the database, and the database is stored in a server, by using the previously mentioned technology of moving picture recognition. In addition, a broadcasting receiving apparatus extracts signature images from an input image stream, and periodically transmits the signature images to the server. When the server receives the extracted signature image, the server may identify the contents ID by comparing the received signature image with the target image so as to determine whether the user watches the image contents.

However, if the above-described alternative approach is used, when moving pictures are generated and transmitted in real time, as in a live broadcast, it is impossible to previously extract a target image and reflect the target image to database, necessitating advanced technologies such as updating the program database in real time.

In addition, since it is impossible for the broadcasting receiving apparatus to recognize ahead of time when an audience rating survey or advertising exposure survey is required, the broadcasting receiving apparatus needs to continue to periodically extract signature images and transmit the signature images to the server. That is to say, under this approach, it is necessary to process content even though no survey may ultimately be required, thus wasting network resources.

Moreover, under this alternative approach, even if the size of a signature image is small, when the number of broadcasting receiving apparatuses on which an audience rating survey is to be performed is several to tens of millions, excessive server load and excessive maintenance fee may result.

SUMMARY

Exemplary embodiments provide a method of surveying watching image content, and a broadcast receiving apparatus and server employing the same.

According to an aspect of an exemplary embodiment, there is provided a method of surveying the watching of image content output from a broadcast receiving apparatus, the method including outputting input image contents on a screen; capturing and storing a signature image of the image contents output on the screen; and when a query including a target image of the image contents to be surveyed is received from an external server, surveying whether there is a signature image identical to the target image, and transmitting a survey result to the external server.

The query may further include a timestamp of when the target image is captured.

The surveying may include setting a search period with reference to the timestamp included in the query; and surveying whether there is a signature image identical to the target image from among signature images captured within the search period.

A start point of the search period may be set based on a difference between a timestamp of the target image included in the query and a system timestamp measured by the broadcast receiving apparatus when the query arrives at the broadcast receiving apparatus.

The time information included in the timestamp may be based on Greenwich Mean Time (GMT).

The query may further include contents identification (ID) of the image contents, and the transmitting may include transmitting the survey result together with the contents ID of the image contents.

The storing may include storing the signature image in a queue having a predetermined size.

The query may be received within a predetermined period of time after the image contents are output, and the predetermined period of time may be determined by the size of the queue.

The image contents may include at least one of broadcast contents, advertising contents, and VOD contents.

According to an aspect of another exemplary embodiment, there is provided a broadcast receiving apparatus including an output unit for outputting input image contents on a screen; an extracting unit for extracting a signature image from the output image contents; a storage unit for storing the extracted signature image; a communication unit for communicating with an external server; and a controller for, when a query including a target image of the image contents to be surveyed is received from an external server, controlling the communication unit to survey whether there is a signature image identical to the target image, and to transmit a survey result to the external server.

The query may further include a timestamp that is time information about a point of time when the target image is captured.

The controller may set a search period with reference to the timestamp included in the query, and surveys whether there is a signature image identical to the target image from among signature images captured within the search period.

A start point of the search period may be set based on a difference between a timestamp of the target image included in the query and a system timestamp measured by the broadcast receiving apparatus when the query arrives at the broadcast receiving apparatus.

The time information included in the timestamp may be based on Greenwich Mean Time (GMT).

The query may further include contents ID of the image contents, and the controller may control the communication unit to transmit the survey result together with the contents ID of the image contents.

The storage unit may store the signature image in a queue having a predetermined size.

The communication unit may receive the query within a predetermined period of time after the image contents are output, and the predetermined period of time may be determined by the size of the queue.

The image contents may include at least one of broadcast contents, advertising contents, and VOD contents.

According to an aspect of another exemplary embodiment, there is provided a method of surveying the watching of image content of a server, the method including extracting a target image of image contents to be surveyed; generating a query including the target image and a timestamp of the target image, wherein the timestamp indicates a point of time where the target image is captured; transmitting the query to a plurality of broadcast receiving apparatuses; and receiving information about whether the image contents are watched, from the plurality of broadcast receiving apparatuses.

The transmitting may include dispersively transmitting the query to the plurality of broadcast receiving apparatuses for a predetermined period of time.

The query may further include contents ID of the image contents to be surveyed.

According to an aspect of another exemplary embodiment, there is provided a server for surveying whether image contents output from a plurality of broadcast receiving apparatuses, the server including an extracting unit for extracting a target image of image contents to be surveyed; a query generating unit for generating a query including the target image and a timestamp of the target image, wherein the timestamp indicates a point of time where the target image is captured; and a communication unit for transmitting the query to a plurality of broadcast receiving apparatuses and for receiving information about whether the image contents are watched, from the plurality of broadcast receiving apparatuses.

The communication unit may dispersively transmit the query to the plurality of broadcast receiving apparatuses for a predetermined period of time.

The query may further include contents identification (ID) of the image contents to be surveyed.

According to an aspect of another exemplary embodiment, there is provided a method of surveying the watching of image content output from a broadcast receiving apparatus, the method including extracting a signature image of input image contents and storing the signature image in a signature queue; when a query including target signature of image contents to be surveyed is received from an external server, surveying whether there is a signature identical to the target signature in the signature queue; and when it is determined that there is the signature identical to the target signature once or more, performing a predetermined additional process.

The query may further include a timestamp that is time information about a point of time when the target image is captured.

The query may further include a program to be executed in the broadcast receiving apparatus, an identifier of a corresponding program, or a universal resource locator (URL) of a predetermined Internet resource, and the performing of the predetermined additional process may include executing the program or accessing the predetermined Internet resource through the URL.

According to an aspect of another exemplary embodiment, there is provided a broadcast receiving apparatus including an output unit for outputting input image contents on a screen; an extracting unit for extracting a signature from the output image contents; a storage unit for storing the extracted signature in a signature queue; a communication unit for communicating with an external server; and a controller for, when a query including target signature of image contents to be surveyed is received from an external server, surveying whether there is a signature identical to the target signature in the signature queue, and for, when it is determined that there is the signature identical to the target signature once or more, performing a predetermined additional process.

The query may further include a timestamp that is time information about a point of time when the target image is captured.

The query may further include a program to be executed in the broadcast receiving apparatus, an identifier of a corresponding program, or a universal resource locator (URL) of a predetermined Internet resource, and when it is determined that there is the signature identical to the target signature once or more, the controller executes the program or accesses the predetermined Internet resource through the URL.

BRIEF DESCRIPTION OF THE DRAWINGS

The above and other aspects will become more apparent by describing in detail exemplary embodiments with reference to the attached drawings in which.

DETAILED DESCRIPTION

Hereinafter, exemplary embodiments will be described in detail with reference to the attached drawings.

Figure 1:
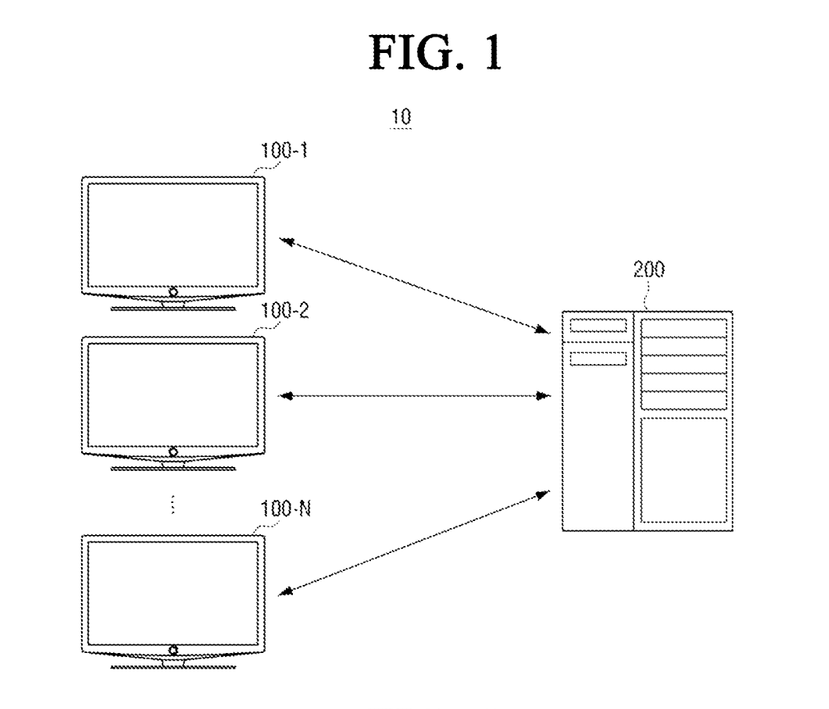
FIG. 1 is a diagram of a system for surveying the watching of image contents, according to an exemplary embodiment.

FIG. 1 is a diagram of a system 10 for surveying the watching of image contents, according to an exemplary embodiment. Referring to FIG. 1, the system 10 includes a plurality of broadcast receiving apparatuses 100-1, 100-2, through 100-n, and a server 200.

The broadcast receiving apparatuses 100-1, 100-2, through 100-n receive image contents input to the broadcast receiving apparatuses from various input sources (e.g., a terrestrial broadcaster, a satellite broadcaster, or a cable broadcaster). The broadcast receiving apparatuses 100-1, 100-2, through 100-n perform signal-processing on the image contents that a user wants to watch, and then display the signal-processed image contents for viewing.

The broadcast receiving apparatuses 100-1, 100-2, through 100-n extract and store signature images of image contents that are currently output. Here, "the signature images of the image contents" refers to images that are captured from the image contents at a predetermined frequency. The signature images may be stored in a signature queue having a predetermined size.

A server 200 extracts the target images from the image contents according to a set of instructions, which may for example be specified by a broadcaster. Here, "target images" refers to images captured from image contents about which the broadcaster wants to perform an audience rating survey or similar survey.

In addition, the server 200 generates a query including the extracted target image and a timestamp of the target image. In this case, the timestamp of the target image may contain time information based on a point of time when the target image is captured. The time information may be based on Greenwich Mean Time (GMT) which serves as a universal time without respect to time zone or region. In addition, the query may include an identifier (referred to hereafter as a "contents identification (ID)") of the image contents.

The server 200 transmits the query to the broadcast receiving apparatuses 100-1, 100-2, through 100-n. In this case, the server 200 dispersively transmits the query to a predetermined number of broadcast receiving apparatuses from among the broadcast receiving apparatuses 100-1, 100-2, through 100-n at staggered times, instead of simultaneously transmitting the query to all the broadcast receiving apparatuses 100-1, 100-2, through 100-n, in order to prevent replies to the server 200 from flooding the server.

In this exemplary embodiment, since the broadcast receiving apparatuses 100-1, 100-2, through 100-n store the signature images in the signature queue having a predetermined size, the server 200 does not have to transmit the query at the instant or at the same time the image contents are output, but may transmit the query after the image contents are output.

The broadcast receiving apparatuses 100-1, 100-2, through 100-n determine whether there is a signature image that is identical to the target image that was included in the received query. The broadcast receiving apparatuses 100-1, 100-2, through 100-n set a search period with respect to the queue by using the timestamp of the target image included in the received query, and then survey whether there is a signature image among the signature images that are captured within the search period, identical to the target image.

The broadcast receiving apparatuses 100-1, 100-2, through 100-n transmit, to the server 200, respective survey results about whether there is found a signature image that is identical to the target image that was included in the received query. When sending the survey results, the broadcast receiving apparatuses 100-1, 100-2, through 100-n may transmit the contents ID included in the query together with the survey result.

When a plurality of survey results sent by the broadcast receiving apparatuses 100-1, 100-2, through 100-n are received by the server 200, the server 200 collects the survey results, and processes information about the audience rating of image contents, advertising exposure, and user preferred contents.

The above-described system for surveying the watching of image contents may be effectively used for an audience rating survey of real-time image contents, an advertising exposure survey, or the like. In addition, since a broadcast receiving apparatus and a server are connected to each other only when a survey is required, the search load is prevented from being excessively concentrated on the server. Additionally, since the broadcast receiving apparatus does not have to continue to transmit a signature image, the server load may be remarkably reduced.

Hereinafter, with reference to FIGS. 2 and 3, a broadcast receiving apparatus 100 and a server 200 will be described in more detail.

Figure 2:
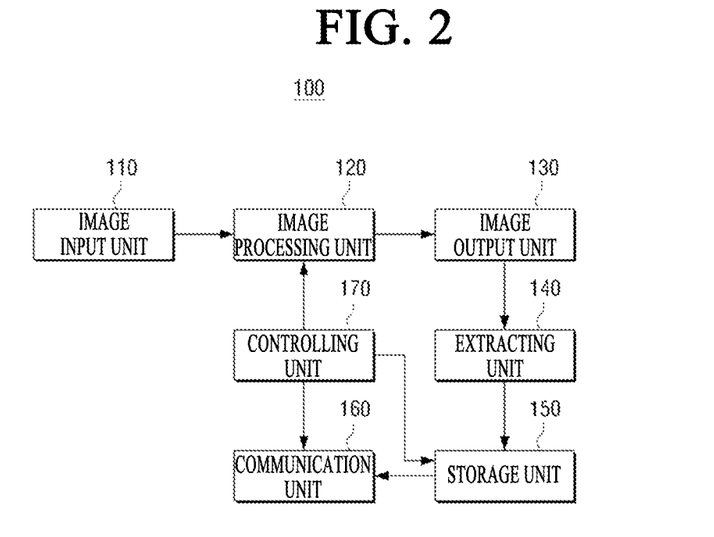
FIG. 2 is a block diagram of the broadcast receiving apparatus according to an exemplary embodiment.

FIG. 2 is a block diagram of the broadcast receiving apparatus 100 according to an exemplary embodiment. Referring to FIG. 2, the broadcast receiving apparatus 100 includes an image input unit 110, an image processing unit 120, an image output unit 130, an extracting unit 140, a storage unit 150, a communication unit 160, and a controlling unit 170. These various units may be implemented as particular hardware or as software running on a general purpose computer processor such as a CPU or the like, the software being accessed for execution from a random access memory or the like.

The image input unit 110 receives and demodulates signals transmitted from various input sources such as a terrestrial broadcaster, a satellite broadcaster, or a cable broadcaster, sent through wired or wireless communication networks. In addition, the image input unit 110 may be connected to an external device, and may receive an image signal from the external device. For example, the image input unit 110 may receive the image through S-Video, component, composite, D-subminiature (D-Sub), digital video interactive (DVI), high definition multimedia interface (HDMI), or the like.

The image processing unit 120 may perform signal processing, such as video decoding or video scaling on an input broadcast signal or on an image signal, and may add graphic user interfaces (GUIs).

The image output unit 130 receives image contents that have been signal-processed by the image processing unit 120, and outputs the image contents to be displayed on a display screen.

The extracting unit 140 extracts a signature image based on the image contents output from the image output unit 130. In this case, the signature image may be an image captured from the output image contents, but this is just an example. Alternatively, the signature image may be a partial image (e.g., a logo, or the like) contained in an image of the output image contents, or may be a signature of the image of the output image contents. In addition, the image contents may be broadcast contents, advertising contents, or video on demand (VOD) contents.

In particular, the extracting unit 140 may extract the signature image of the image contents output by the image output unit 130 at a predetermined frequency. For example, the extracting unit 140 may extract the signature image of the image contents output by the image output unit 130 at a frequency corresponding to 0.5 seconds. In particular, since the extracting unit 140 extracts the signature image at a frequency corresponding to a short period of time, it is possible to determine whether the image contents such as advertising, which have a short broadcast period of time, are watched.

The storage unit 150 may store various programs required to operate the broadcast receiving apparatus 100, and may be a memory, a hard disk drive (HDD), or the like.

In particular, the storage unit 150 stores the signature image extracted by the extracting unit 140 in a signature queue. The queue may be an ordered list having one end in which data is inserted and another end in which data is deleted, and may be referred to as a first in first out (FIFO) ordered list.

In this exemplary embodiment, the signature queue may have a predetermined size so as to store a predetermined number of signature images. For example, if one signature image corresponds to 100 bytes, the signature queue may have a size of about 1.4 Mb in order to store 14400 signature images. Here, if the extracting unit 140 captures two signature images every second, the signature queue may store signature images of image contents corresponding to 7200 seconds, that is, 2 hours.

The communication unit 160 is connected to the server 200 through a network, and transmits and receives data to and from the server 200. In detail, the communication unit 160 may receive a query, including a target image and a timestamp of the target image from the server 200. The query may further include the contents ID of the image contents, as well as an indication of a subsequent action to be taken. The indication of the subsequent action to be taken may include a variety of things, such as, for example, a program to be executed in a broadcast receiving apparatus, an identifier of a corresponding program, or a universal resource locator (URL) of the Internet resource.

In addition, the communication unit 160 may transmit, to the server 200, a survey result about whether there is found a signature image identical to the target image.

The controlling unit 170 controls an overall operation of the broadcast receiving apparatus 100 according to a user command received from a user input unit (not shown).

In particular, when the controlling unit 170 receives the query including the target image of the image contents for which a survey of the level of viewership is being carried out, from the server 200, outside the broadcast receiving apparatus 100, the controlling unit 170 determines or "surveys" whether there is in the signature queue of the storage unit 150 a signature image identical to the target image.

In this exemplary embodiment, the controlling unit 170 may set a search period of the queue by using the timestamp of the target image included in the received query, and may determine whether there is, contained among the signature images corresponding to the search period of the set queue, a signature image identical to the target image.

In this case, a start point of the search period may be set based on a difference between the timestamp of the target image, included in the query, and a system timestamp measured, by the broadcast receiving apparatus 100, when the query arrives at the broadcast receiving apparatus 100. For example, if the timestamp of the target image is 7 PM, and the system timestamp measured by the broadcast receiving apparatus 100 is 8:30 PM, a difference between the timestamp of the target image and the system timestamp measured by the broadcast receiving apparatus 100 when the query arrives at the broadcast receiving apparatus 100 is 1 hour and 30 minutes. Thus, the controlling unit 170 may set a point of time before 1 hour and 30 minutes from an end point of the signature queue as the start point of the search period. In addition, the controlling unit 170 may search for signature images contained in a predetermined period (e.g., 3 minutes) from the start point of the search period, which is calculated as described above.

If there is a signature image identical to the target image in the search period of the signature queue, the controlling unit 170 may generate survey result information indicating that a user has viewed the corresponding image contents, and may control the communication unit 160 to transmit the survey result information to the server 200.

However, if there is no signature image identical to the target image found during the search period for the signature queue, the controlling unit 170 may generate survey result information indicating that the user did not view the corresponding image contents, and may control the communication unit 160 to send negative survey result information to the server 200.

When the survey result information is transmitted, if a contents ID is included in the query received from the server 200, the controlling unit 170 may transmit the contents ID of the image contents together with the survey result information.

As a survey result, if the controlling unit 170 determines that the signature image is identical to the target image once or more than once, a predetermined additional process may be performed. For example, the controlling unit 170 may execute a program included in the query, or may access a predetermined Internet resource through a URL of the Internet resource included in the query.

When a survey is conducted as to whether image contents are viewed, by the broadcast receiving apparatus 100, a broadcaster may survey and audience rating of broadcasting contents, and survey the advertising exposure by processing information about whether the image contents are watched. In addition, preferred user content may be identified through information about whether the image contents are watched, thereby providing information as to what image contents might be appropriate to display to a user for advertising or the like. For example, the broadcaster may identify the user's preferred contents through the survey result information, thereby enabling customized advertising or image contents recommending services.

Figure 3:
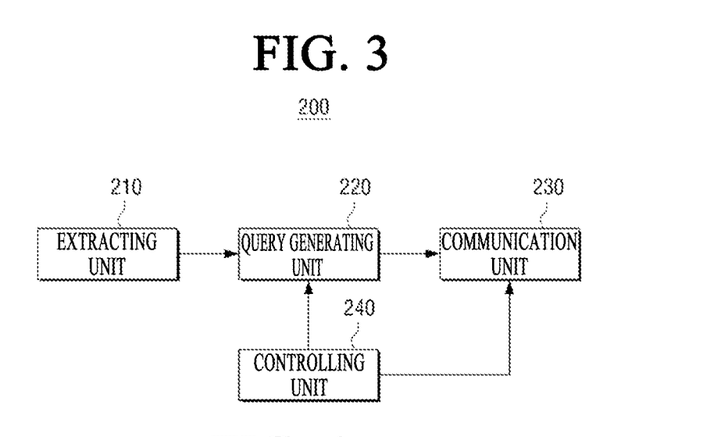
FIG. 3 is a block diagram of a server according to an exemplary embodiment.

FIG. 3 is a block diagram of a server 200 according to an exemplary embodiment. Referring to FIG. 3, the server 200 includes an extracting unit 210, a query generating unit 220, a communication unit 230, and a controlling unit 240.

The extracting unit 210 extracts a target image of the image contents provided by a broadcaster. In this case, the target image refers to a predetermined image of the image contents on which the broadcaster wants to conduct the survey as to whether the content is being viewed. In this case, the extracting unit 210 may include a separate storage unit (not shown) for storing the target image.

The query generating unit 220 generates a query by using the target image extracted by the extracting unit 210 and a timestamp of when the target image is extracted. In this case, the timestamp may be based on Greenwich Mean Time (GMT) which is the time zone that is universal and without respect to different geographic locations. In addition, the timestamp may be based on Universal Time Coordinated (UTC) which is another standard universal time.

In this case, the generated query may further include a contents ID of the image contents, a program to be executed in a broadcast receiving apparatus, an identifier of a corresponding program, or a URL of the Internet resource.

The communication unit 230 is connected to the broadcast receiving apparatuses 100-1, 100-2, through 100-n through a network, and transmits and receives data to and from the receiving apparatuses 100-1, 100-2, through 100-n. In detail, the communication unit 230 may transmit the query generated by the query generating unit 220 to the broadcast receiving apparatuses 100-1,100-2, through 100-n. The communication unit 230 may dispersively transmit the query to a predetermined number (i.e., a subset) of broadcast receiving apparatuses from among the entire set broadcast receiving apparatuses 100-1,100-2, through 100-n with a time lag, instead of simultaneously transmitting the query to all the broadcast receiving apparatuses 100-1,100-2, through 100-n. For example, if the number of the broadcast receiving apparatuses 100-1,100-2, through 100-n is ten million, the communication unit 230 may transmit the query to a million broadcast receiving apparatuses at a frequency corresponding to a certain number of apparatuses every 10 minutes. Thus, even when 100 minutes as a delay time elapse after the communication unit 230 outputs image contents, it is still possible to determine whether the image contents were viewed. In this case, the delay time of the communication unit 230 may be determined according to a size of the signature queue stored in the broadcast receiving apparatus 100. That is, if the size of the signature queue corresponds to a size for storing signature images of the image contents corresponding to two hours, the delay time of the communication unit 230 may be a maximum of 2 hours.

In addition, the communication unit 230 may receive survey result information (that is, information as to whether image contents are watched) related to the target image from the broadcast receiving apparatuses 100-1,100-2, through 100-n. In this case, as described above, when the query is not simultaneously transmitted to all of the stations at once, the communication unit 230 may dispersively receive survey result information from a predetermined number of broadcasting receiving apparatuses from among the broadcast receiving apparatuses 100-1,100-2, through 100-n with a time lag, instead of simultaneously receiving the survey result information of the target image from the broadcast receiving apparatuses 100-1,100-2, through 100-n.

The controlling unit 240 receives a user command through a user input unit (not shown), and controls an overall operation of the server 200.

In particular, the controlling unit 240 collects the survey result information of the target image that is received through the communication unit 230 so as to perform an audience rating survey of corresponding image contents or an advertising exposure survey.

Since a survey as to whether broadcasted contents are being viewed may be undertaken by the server 200, a broadcaster may reduce costs for the server 200, and may perform an audience rating survey on image contents that are broadcast for even a short period of time, such as whether a particular advertisement is being viewed.

Figure 4:
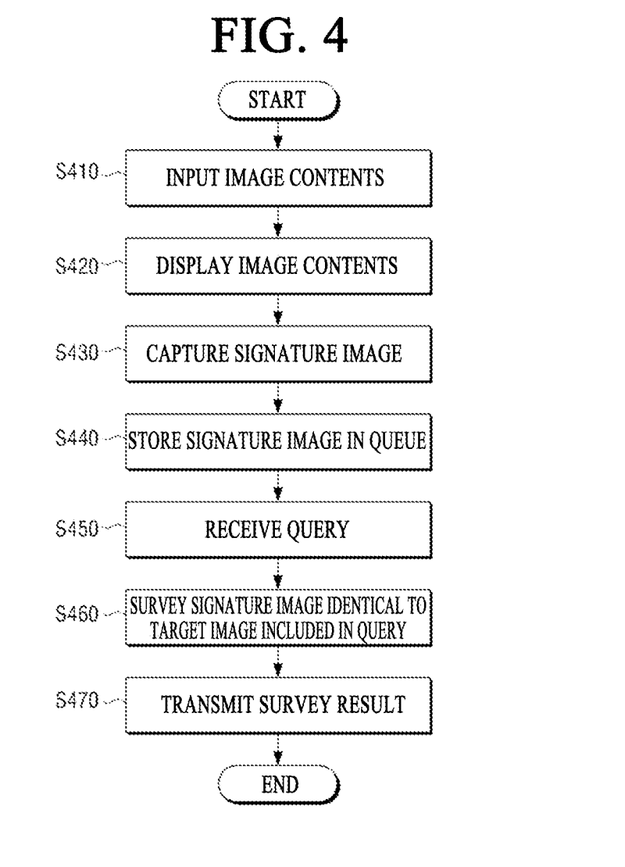
FIG. 4 is a flowchart of a method of surveying the watching of image contents of a broadcast receiving apparatus, according to an exemplary embodiment

Hereinafter, with reference to FIGS. 4 through 6, a surveying method of watching of the image contents will be described. FIG. 4 is a flowchart of a method of surveying the watching of image contents of the broadcast receiving apparatus 100, according to an exemplary embodiment.

The broadcast receiving apparatus 100 receives image contents through various input sources (S410). In this case, examples of the input sources may include Internet protocol television (IPTV) and video on demand (VOD) as well as a terrestrial broadcaster, a satellite broadcaster, and a cable broadcaster.

The broadcast receiving apparatus 100 displays the received image contents (S420).

When the image contents are displayed, the broadcast receiving apparatus 100 captures a signature image by using the displayed image contents (S430). In this instance, the broadcast receiving apparatus 100 may capture signature images of the displayed image contents at a predetermined frequency (e.g., two signature images every second).

When a signature image is captured, the broadcast receiving apparatus 100 stores the captured signature image in a queue (S440 The queue may have a predetermined size so as to store the signature images of the image contents, which are captured at a predetermined frequency. For example, if one signature image corresponds to 100 bytes, and two signature images are captured every second, the broadcast receiving apparatus 100 may have a queue that is about 1.4 Mb in order to store enough signature images for about a 2 hours period.

When the broadcast receiving apparatus 100 receives a query from the server 200 which is outside the broadcast receiving apparatus 100 (S450), the broadcast receiving apparatus 100 surveys whether there is a signature image identical to a target image included in the query (S460).

In detail, the broadcast receiving apparatus 100 sets a search period of the queue by using a timestamp of the target image included in the query, and surveys whether there is, among the signature images in the queue, an image identical to the target image. In this case, the start point of the search period may be set based on a difference between a timestamp of the target image included in the query and a system timestamp measured by the broadcast receiving apparatus 100 when the query arrives at the broadcast receiving apparatus 100.

In addition, the broadcast receiving apparatus 100 transmits, to the server 200 outside the broadcast receiving apparatus 100, a survey result about whether there is the signature image identical to the target image included in the received query (S470).

Figure 5:
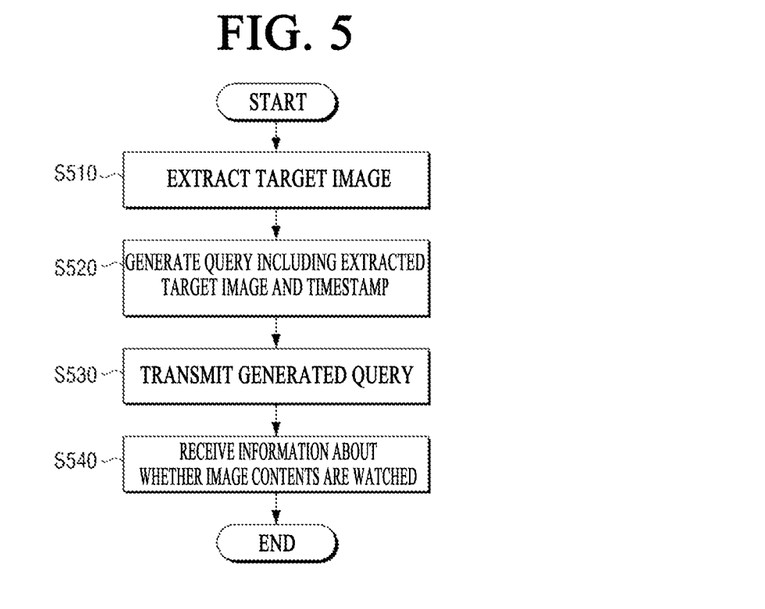
FIG. 5 is a flowchart of a method of surveying the watching of image contents of the server 200, according to an exemplary embodiment.

FIG. 5 is a flowchart of a method of surveying the watching of image contents of the server 200, according to an exemplary embodiment.

First, the server 200 extracts a target image of the image contents (S510). In this case, the target image refers to a predetermined image of the image contents on which a broadcaster wants to survey whether to watch.

When the target image is extracted, the server 200 generates a query by using the target image and a timestamp of the target image (S520). In this case, the timestamp of the target image may contain time information about a point of time when the target image is captured. The time information may be based on Greenwich Mean Time (GMT), UTC, or the like. T In addition, the query may include contents identification (ID) of the image contents.

When the query is generated, the server 200 transmits the generated query to the broadcast receiving apparatuses 100-1,100-2, through 100-n (S530). In this case, the server 200 dispersively transmits the query to a predetermined number of broadcast receiving apparatuses from among the broadcast receiving apparatuses 100-1,100-2, through 100-n with a time lag, instead of simultaneously transmitting the query to all the broadcast receiving apparatuses 100-1,100-2, through 100-n. For example, if the number of the broadcast receiving apparatuses 100-1,100-2, through 100-n is ten million, the server 200 may transmit the query to a million broadcast receiving apparatuses every 10 minutes. In this case, a delay time by which the server 200 delays transmitting the query may be determined according to a size of the queue of the broadcast receiving apparatus 100.

In addition, the server 200 receives information about whether the image contents are watched, from the broadcast receiving apparatuses 100-1,100-2, through 100-n (S540). In this case, the server 200 may dispersively receive survey result information about whether image contents are watched from a predetermined number of broadcasting receiving apparatuses from among the broadcast receiving apparatuses 100-1,100-2, through 100-n with a time lag, instead of simultaneously receiving the survey result information of the target image from the broadcast receiving apparatuses 100-1,100-2, through 100-n. As described above, if the server 200 may receive the survey result information from a predetermined subset of receiving apparatuses 100-1,100-2, through 100-n with a time lag, thereby reducing the load of the server 200.

When the server 200 receives the survey result information, about whether image contents are watched, from the broadcast receiving apparatuses 100-1,100-2, through 100-n, the server 200 collects the survey result information from the broadcast receiving apparatuses 100-1,100-2, through 100-n, and processes the survey result information. For example, if the image contents are broadcast contents, the server 200 may perform an audience rating survey on the contents through survey result information of the broadcast contents. If the image contents are advertising contents, the server 200 may gauge the advertising exposure through the survey result information related to the advertising contents.

In addition, the server 200 may identify the kind of content that a user prefers to view from the survey result information thereby enabling the providing of customized advertising to user.

Figure 6:
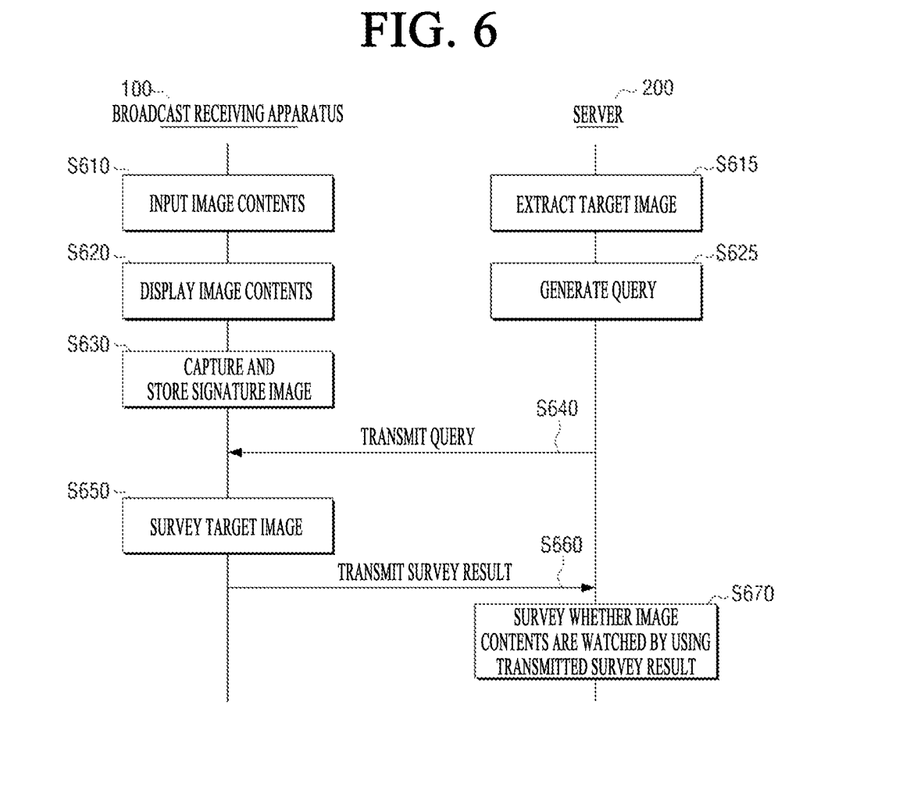
FIG. 6 is a flowchart of a method of surveying the watching of image contents of a system for surveying the watching of image contents, according to an exemplary embodiment.

FIG. 6 is a flowchart of a method of surveying the watching of image contents of the system 10, according to an exemplary embodiment.

First, the broadcast receiving apparatus 100 receives image contents through various sources (S610), and displays the image contents (S620). The broadcast receiving apparatus 100 captures signature images of the displayed image contents at a predetermined frequency, and stores the signature images (S630). In this case, the signature image may be stored in a signature queue having a predetermined size.

In addition, the server 200 extracts a target image from the image contents for which a broadcaster wants to survey (S615). In addition, the server 200 generates a query by using the target image and a timestamp of the target image (S625).

In addition, the server 200 transmits the generated query to the broadcast receiving apparatus 100 (S640).

The broadcast receiving apparatus 100 surveys whether there is a signature image identical to the target image by using the received query (S650). In detail, the broadcast receiving apparatus 100 sets a search period of the queue by using the timestamp of the target image included in the received query, and then surveys whether there is the signature image identical to the target image from among the signature images previously captured and corresponding to the search period.

Once the processing of all the signature images has been completed, the broadcast receiving apparatus 100 transmits a survey result, that is, information about whether image contents are watched, to the server 200 (S660).

In addition, the server 200 determines whether the image contents are watched, by using the transmitted survey result (S670).

When a determination as to whether image contents are viewed is carried out as described with reference to FIGS. 4 through 6, it is not necessary to determine whether the image contents are viewed at the same time that the image contents are being displayed. In this case, even if moving pictures are generated and transmitted in real time, such as is the case in a live broadcast, a determination as to whether the image contents are being viewed may still be correctly determined.

Since signature images are extracted at a frequency corresponding to a short period of time (e.g., two signature images every second), it is possible to make a determination as to whether relatively short broadcast time periods are viewed, such as periods corresponding to advertising.

Also, since the server 200 dispersively transmits and receives data to and from a predetermined number of broadcast receiving apparatuses, instead of simultaneously transmitting and receiving data to and from millions to tens of millions of broadcast receiving apparatuses, the load of the server 200 is spread out, and thus a broadcaster may reduce costs for the server 200. That is to say, it becomes less necessary for a server 200 to have the capability to process the transmitting and receiving of data for all of the apparatuses simultaneously and this means that a less expensive server may be used.

The broadcast receiving apparatus 100 may be a TV, but this is just an example. That is, the broadcast receiving apparatus 100 may be any electronic device adapted to receive a broadcast. For example, the broadcast receiving apparatus 100 may be a personal computer (PC), a smart phone, a tablet PC, or the like. Moreover, even though the term "broadcast" has been used, it will be understood that the term is meant to encompass the transmission of motion picture or video data through any means.

While exemplary embodiments have been particularly shown and described, it will be understood by those of ordinary skill in the art that various changes in form and detail may be made without departing from the spirit and scope of the inventive concept as defined by the following claims.

What is claimed is:

1. A method of surveying watching of image content output from a broadcast receiving apparatus, the method comprising:
   displaying image contents on a screen, by the broadcast receiving apparatus;
   capturing signature images of the image contents, by the broadcast receiving apparatus; and
   in response to receipt of a query, comprising a target image of image contents to be surveyed and information for identifying the image contents, from an external server, determining whether at least one of the captured signature images matches to the target image, by the broadcast receiving apparatus and if the at least one of the captured signature images matches to the target image, transmitting the information to the external server,
   wherein the query is to survey whether the image contents including the signature image matching to the target image are watched by a user, and
   wherein the capturing comprises capturing the signature images of the image contents at a predetermined time interval.

2. The method of claim 1, wherein the query further comprises a timestamp of a point of time when the target image is captured,
   wherein the transmitting comprises transmitting the information to the external server along with a time stamp corresponding to the target image matching to the at least one of the captured signature images.

3. The method of claim 2, wherein the determining comprises:
   setting a search period with reference to the timestamp included in the query; and
   surveying whether at least one of the signature images captured during the search period matches to the target image.

4. The method of claim 3, wherein a start point of the search period is based on a difference between the timestamp of the target image included in the query and a timestamp measured by the broadcast receiving apparatus when the query is received.

5. The method of claim 2, wherein the timestamp is based on Greenwich Mean Time.

6. The method of claim 1, wherein the information comprises contents identification (ID) of the image contents.

7. The method of claim 1, wherein the capturing comprises storing the captured signature images in a queue having a predetermined size.

8. The method of claim 7, wherein:
the query is received within a predetermined period of time after the image contents are output, and
the predetermined period of time is determined based on the predetermined size of the queue.

9. The method of claim 1, wherein the image contents comprises at least one of broadcast content, advertising content, and video on demand (VOD) content.

10. The method of claim 1, wherein the predetermined time interval is set based on a type of the displayed image contents.

11. The method of claim 1, wherein the signature image is one of an entire image and an partial image captured from the output image contents.

12. A broadcast receiving apparatus comprising:
an output unit which displays image contents on a screen;
an extracting unit which extracts a signature image from the displayed image contents;
a communication unit which communicates with an external server; and
a controller which, in response to receipt of a query, comprising a target image of the image contents to be surveyed and information for identifying the image contents, from an external server, determines whether at least one of the captured signature images matches to the target image, and if the at least one of the captured signature images matches to the target image, controls the communication unit to transmit the information to the external server,
wherein the query is to survey whether the image contents including the signature image matching to the target image are watched by a user, and
wherein the extracting unit extracts the signature image at a predetermined time interval.

13. The broadcast receiving apparatus of claim 12, wherein the query further comprises a timestamp that indicating a point of time when the target image is captured,
wherein the controller controls the communication unit to transmit the information to the external server along with a time stamp corresponding to the target image matching to the at least one of the captured signature images.

14. The broadcast receiving apparatus of claim 13, wherein the controller sets a search period with reference to the timestamp included in the query, and determines whether a signature image, matching to the target image, is among signature images captured within the search period.

15. The broadcast receiving apparatus of claim 14, wherein a start point of the search period is set based on a difference between:
the timestamp of the target image included in the query, and
a system timestamp based on when the query arrives at the broadcast receiving apparatus.

16. The broadcast receiving apparatus of claim 13, wherein the time information included in the timestamp is based on Greenwich Mean Time.

17. The broadcast receiving apparatus of claim 12, wherein the information comprises contents identification (ID) of the image contents.

18. The broadcast receiving apparatus of claim 12, further comprises:
a storage unit which stores the extracted signature images,
wherein the storage unit stores the extracted signature images in a queue having a predetermined size.

19. The broadcast receiving apparatus of claim 18, wherein:
the communication unit receives the query within a predetermined period of time after the image contents are output, and
the predetermined period is based on the predetermined size of the queue.

20. The broadcast receiving apparatus of claim 12, wherein the image contents comprises at least one of: broadcast contents, advertising contents, and video on demand (VOD) contents.

21. A server for surveying whether image contents, output from a plurality of broadcast receiving apparatuses, are viewed, the server comprising:
an extracting unit which extracts a target image from the image contents to be surveyed;
a query generating unit which generates a query comprising the target image, information for identifying the image contents and a timestamp of the target image, wherein the timestamp indicates a point of time when the target image is captured; and
a communication unit which transmits the query to a plurality of broadcast receiving apparatuses and receives the information from the plurality of broadcast receiving apparatuses,
wherein the communication unit transmits the query to the plurality of broadcast receiving apparatuses during a predetermined period of time, and
wherein the query is to survey whether the image contents including signature image matching to the target image are watched by a user.

22. A method of surveying watching of image content output from a broadcast receiving apparatus, the method comprising:
extracting a plurality of signature images of displayed image content, and storing the signature images in a signature queue, by broadcast receiving apparatus;
in response to receipt a query, comprising a target signature of the image contents to be surveyed and information for identifying the image contents, from an external server, determining whether at least one of the signature images in the signature queue matches to the target signature, by broadcast receiving apparatus; and
if the at least one of the signature images in the signature queue matches to the target signature, transmitting the information to the external server, by broadcast receiving apparatus,
wherein the query is to survey whether the image contents including the signature image matching to the target signature are watched by a user, and
wherein the extracting comprises extracting the plurality of signature images at a predetermined time interval.

23. The method of claim 22, wherein the query further comprises a timestamp indicating a point of time when the target signature is captured,
wherein the transmitting comprises transmitting the information to the external server along with the time stamp corresponding to the target signature matching to the at least one of the other signature images.

24. The method of claim 23, wherein the transmitting comprises performing a predetermined additional process,
wherein the query further comprises one or more of:
a program to be executed in the broadcast receiving apparatus,
an identifier of a corresponding program, and
a universal resource locator (URL) of a predetermined Internet resource, and
the performing the predetermined additional process comprises executing the program or accessing the predetermined Internet resource through the URL.

25. A broadcast receiving apparatus comprising:
an output unit which outputs input image contents on a screen;
an extracting unit which extracts signatures from the output image contents;
a storage unit which stores the extracted signatures in a signature queue;
a communication unit which communicates with an external server; and
a controller which, in response to receipt of a query comprising target signature of image contents to be surveyed and information for identifying the image contents, from an external server, determines whether at least one of the extracted signatures in the signature queue matches to the target signature and, if the at least one of the extracted signature matches to the target signature, controls the communication unit to transmit the information to the external server,
wherein the query is to survey whether the image contents including the signature matching to the target signature are watched by a user, and
wherein the extracting unit extracts the signatures at a predetermined time interval.

26. The broadcast receiving apparatus of claim 25, wherein the query further comprises a timestamp indicating a point of time when the target signature was captured,
wherein the controller controls the communication unit to transmit the information to the external server along with a time stamp corresponding to the target signature matching to the at least one of the extracted signatures.

27. The broadcast receiving apparatus of claim 25, wherein the query further comprises one or more of:
a program to be executed in the broadcast receiving apparatus,
an identifier of the program, and
a universal resource locator (URL) of a predetermined Internet resource, and
if the at least one of the extracted signature matches to the target signature, the controller executes the program or accesses the predetermined Internet resource through the URL.

28. A broadcast receiving apparatus, comprising:
a control unit comprising a processor, and carrying out control operations;
a display; and
a storage;
wherein the control operations comprise:
displaying image content on the display;
generating a signature corresponding to the displayed image content, wherein the generating comprising generating the signature at a predetermined time interval;
storing the generated signatures in a signature queue in the storage;
receiving a target signature of image contents to be surveyed and information for identifying the image contents from an external server;
determining whether the received target signature matches to one or more of the signatures in the signature queue; and
transmitting the information to the external server, if the received target signature matches to one or more of the signatures in the signature queue,
wherein the query is to survey whether the image contents including one or more of the signatures matching to the received target signature are watched by a user.

29. The broadcast receiving apparatus as set forth in claim 28, wherein the target signature is received together with an indication of a target signature collection time.

30. The broadcast receiving apparatus as set forth in claim 29, wherein the determining whether the received target signature matches to the one or more of the signatures in the signature queue is carried out with respect to only ones of the signatures in the signature queue that have collection times that are within a predetermined period of time from the target signature collection time.

31. The broadcast receiving apparatus as set forth in claim 28, wherein:
the target signature is received together with an indication of a subsequent action to be taken; and
when the determination indicates that the received target signature matches to one or more of the signatures in the signature queue, carrying out the subsequent action to be taken.

* * * * *